(12) United States Patent
Schroeer et al.

(10) Patent No.: US 8,205,832 B2
(45) Date of Patent: Jun. 26, 2012

(54) FLOOR STRUCTURE FOR A FUSELAGE

(75) Inventors: Thorsten Schroeer, Buxtehude (DE); Thorsten Roming, Himmelpforten (DE)

(73) Assignee: AIRBUS Deutschland GmbH, Hamburg (DE)

( * ) Notice: Subject to any disclaimer, the term of this patent is extended or adjusted under 35 U.S.C. 154(b) by 739 days.

(21) Appl. No.: 12/226,701

(22) PCT Filed: Apr. 25, 2007

(86) PCT No.: PCT/EP2007/054040
§ 371 (c)(1), (2), (4) Date: Feb. 17, 2009

(87) PCT Pub. No.: WO2007/122246
PCT Pub. Date: Nov. 1, 2007

(65) Prior Publication Data
US 2010/0044510 A1    Feb. 25, 2010

Related U.S. Application Data

(60) Provisional application No. 60/794,766, filed on Apr. 25, 2006.

(30) Foreign Application Priority Data

Apr. 25, 2006   (DE) .......................... 10 2006 019 123

(51) Int. Cl.
*B64C 1/00*    (2006.01)
(52) U.S. Cl. ........................................ 244/119; 244/120
(58) Field of Classification Search ................ 244/119, 244/120; 52/167.1, 167.3
See application file for complete search history.

(56) References Cited

U.S. PATENT DOCUMENTS

| 1,538,962 | A | * | 5/1925 | Weinberg ..................... 244/119 |
| 2,236,482 | A | * | 3/1941 | Zindel ........................... 244/119 |
| 4,479,621 | A | * | 10/1984 | Bergholz ................. 244/117 R |
| 5,871,178 | A |   | 2/1999 | Barnett et al. |
| 5,876,024 | A |   | 3/1999 | Hain |
| 6,438,905 | B2 | * | 8/2002 | Constantinou .............. 52/167.3 |
| 6,554,225 | B1 |   | 4/2003 | Anast et al. |
| 6,837,010 | B2 | * | 1/2005 | Powell et al. ............... 52/167.3 |
| 2004/0245391 | A1 | * | 12/2004 | Kunzel et al. ................ 244/119 |
| 2005/0108959 | A1 | * | 5/2005 | Powell et al. ............... 52/167.1 |
| 2008/0093503 | A1 | * | 4/2008 | Cacciaguerra ............... 244/119 |
| 2011/0011978 | A1 | * | 1/2011 | Haack et al. ................. 244/119 |

FOREIGN PATENT DOCUMENTS

| DE | 31 41 869 A1 | 5/1983 |
| DE | 101 45 276 A1 | 7/2003 |
| JP | 58-78895 A | 5/1983 |
| JP | 6298186 A | 10/1994 |
| WO | WO 2005/012085 | 2/2005 |

* cited by examiner

*Primary Examiner* — Christopher P Ellis
(74) *Attorney, Agent, or Firm* — Maginot, Moore & Beck (57) ABSTRACT

The present invention provides a floor structure for a fuselage comprising a plurality of cross beams to which respectively at least one first strut and at least one second strut are associated for connecting the respective cross beam to the fuselage. The at least one first strut is aligned in a corresponding first direction vector and the at least second strut is aligned corresponding to a second direction vector. The projections of the first direction vector and of the second direction vector onto the longitudinal direction of the fuselage are different for absorbing a force acting in the longitudinal direction of the fuselage on the floor structure, through the first and second struts.

11 Claims, 7 Drawing Sheets

FLOOR STRUCTURE FOR A FUSELAGE

FIELD OF THE INVENTION

The present invention relates to a floor structure, in particular a floor structure for an aircraft fuselage.

BACKGROUND OF THE INVENTION

Although usable for any floor structures, the present invention, as well as the problem underlying said invention, is described in more detail relative to a floor structure in an aircraft fuselage.

In passenger aircraft, the inside of an aircraft fuselage is divided into a plurality of decks or regions. Typically, a space for air freight (cargo) and baggage is located in a lowest deck. The rows of seats and inhabitable spaces for the passengers are accommodated in one or more decks located thereabove.

In one technique known to the inventor, a floor for the upper decks is arranged on cross beams. These cross beams are supported by struts aligned in the vertical direction. Forces acting in the transverse direction of the fuselage and the longitudinal direction of the fuselage are transmitted laterally by the cross beams to frames of the aircraft fuselage. So that the forces, in particular forces occurring in the longitudinal direction of the fuselage, are able to be transmitted, the cross beams extend as far as the frames and are directly connected thereto.

The cross beams, the struts arranged in the vertical direction and the frames, together with the skin of the aircraft fuselage encompass an edge region in which supply lines, signal lines, etc. are typically laid. After assembling the cross beams and the floor, the access to this edge region becomes considerably more difficult, which is why a subsequent introduction of supply lines, etc. during the manufacture of the aircraft is costly.

SUMMARY OF THE INVENTION

An object of the present invention is to provide a supporting structure for a floor which allows improved access to the edge region.

According to a first aspect of the invention, this object is achieved by a floor structure for a fuselage comprising a plurality of cross beams to which respectively at least one first strut and at least one second strut are associated for connecting the respective cross beam to the fuselage; the at least one first strut being aligned in a corresponding first direction vector and the at least second strut being aligned corresponding to a second direction vector; and the projections of the first direction vector and of the second direction vector onto the longitudinal direction of the fuselage being different for absorbing a force acting in the longitudinal direction of the fuselage on the floor structure, through the first and second struts.

One idea of the present invention is to allow access to the edge region from above, i.e. from the passenger region. One aspect of the invention is to reduce the dimensions of the force-absorbing structures, or even to remove the force-absorbing structures that terminate the edge region at the top. One aspect of the present invention is that the forces acting in the longitudinal direction of the fuselage are transmitted through the first and second struts to the fuselage.

In order for the first and second struts to transmit the forces acting in the longitudinal direction of the fuselage, the plurality of struts are not allowed to be rotated together about their fastening points. In other words, the angle between the first and second struts is fixedly predetermined by the construction, said angle being able to be determined in the plane which is defined by the vertical direction of the fuselage and the longitudinal direction of the fuselage.

In order to ensure this, the first strut and the second strut are aligned in different first and second directions, i.e. are aligned according to different direction vectors. It is, therefore, important that a component of the direction vector in the longitudinal direction of the fuselage of the first and second direction vector is different. By projecting the first and second direction vector onto the longitudinal direction of the fuselage it is possible to detect whether the component is different in the longitudinal direction of the fuselage in a manner relevant to the floor structure. In a projection of the direction vectors onto a plane generated by the longitudinal direction of the fuselage and the vertical direction of the fuselage, the two direction vectors appear as different inclinations relative to the longitudinal direction of the fuselage.

In the above sense, the direction vector shall be assumed to be a vector normalized to a standard length, e.g. one, with three directional components corresponding to the longitudinal direction of the fuselage, the transverse direction of the fuselage, and the vertical direction of the fuselage. The projections of two direction vectors onto the longitudinal axis of the fuselage differ in the above sense, when the amount, i.e. the length of the projection is different and/or the projection is anti-parallel.

For the absorption of a force acting in the longitudinal direction of the fuselage it is irrelevant whether the components of the first direction vector and of the second direction vector, in the transverse direction of the fuselage, are different.

For the aforementioned aspect of the present invention it is, furthermore, not absolutely necessary that all cross beams of a floor structure are provided with a first and second strut.

According to a second aspect of the invention, a floor structure for a fuselage comprises a plurality of cross beams arranged in the transverse direction of the fuselage at a distance from the fuselage. As a result, a possibility of access to the edge region is provided from above. Furthermore, a weight saving is achieved by the short cross beams.

According to an embodiment, the plurality of cross beams are arranged in the transverse direction of the fuselage at a distance from the fuselage. The plurality of cross beams have to be arranged parallel to one another.

According to an embodiment, the first and second struts are arranged in at least one row which is aligned in the longitudinal direction of the fuselage. The same number of first struts and the same number of second struts may be arranged in one of the rows. Furthermore, the struts of one row may be arranged in one plane.

In one embodiment, the first struts are aligned parallel to the vertical direction of the fuselage. As a result, an optimal flux of force of the forces acting in the vertical direction, i.e. in the direction of gravity, is ensured.

According to an embodiment, the fuselage has a plurality of frames, at least one first strut and one second strut being arranged on each cross beam, this first arranged strut and this second arranged strut being fastened to two different frames. As a result, the different first and second directions and direction vectors, as required according to one embodiment, are implemented. Additionally, a direct flux of force is achieved without a large number of mechanical elements inserted onto the supporting frames. The cross beams are optionally arranged parallel to the frames and may also be arranged in one plane which is predetermined by the frames.

According to an embodiment, an outer floor plate is fastened to the cross beam and to the fuselage. This outer floor plate may, on the one hand, serve as a floor for the passenger space and additionally allows a flux of force extending in the transverse direction of the fuselage. The floor edge may be releasably fastened to the cross beam and/or to the fuselage. This advantageously enables the floor edge to be removed during assembly or optionally to be folded away with a support on one side, so that access is allowed to the edge region.

In one embodiment, the outer floor plate is produced from a composite material and/or from a plurality of layers and comprises one-piece sleeves which are continuous from an upper face of the outer floor plate to a lower face of the outer floor plate and which serve to fasten the outer floor plate to the cross beam and/or the fuselage by means of screws, bolts, pegs or the like. The outer floor plate may advantageously be produced by means of a composite material which has a high degree of stiffness in the transverse direction of the fuselage with a low weight. In a similar manner, such an outer floor plate may be produced by a multi-ply layer, for example by a honeycomb structure enclosed between two layers. The one-piece sleeves provide sufficient mechanical stability, enabling repeated insertion and removal of fastening means, such as screws, bolts or pegs. The one-piece sleeves may be produced from a glass material, for example a silica glass.

Instead of continuous sleeves, sleeves which are sealed at the top may also be used. A fastening of the outer floor plate may be achieved by pins in the cross beam and/or the fuselage.

In one embodiment, the struts are connected by means of a hinged joint to the cross beam and/or the fuselage. As a result, the supporting structure is able to yield advantageously during the flight, when the aircraft fuselage twists slightly.

BRIEF DESCRIPTION OF THE DRAWINGS

The invention is described in more detail hereinafter with reference to embodiments by referring to the accompanying figures of the drawings, in which.

In the figures, the same reference numerals denote the same components or components which have identical functions, insofar as nothing contradictory is revealed.

DETAILED DESCRIPTION OF THE INVENTION

In the description of the following embodiments, directions are used that refer to the finished aircraft. A longitudinal direction of the fuselage or longitudinal direction x is parallel to a line which extends from the tip of the aircraft to the rear. A transverse direction of the fuselage or transverse direction y is parallel to a connecting line from the tip of the left wing to the tip of the right wing. A vertical direction of the fuselage or vertical direction z is parallel to the direction of gravity for a stationary aircraft.

Figure 1:
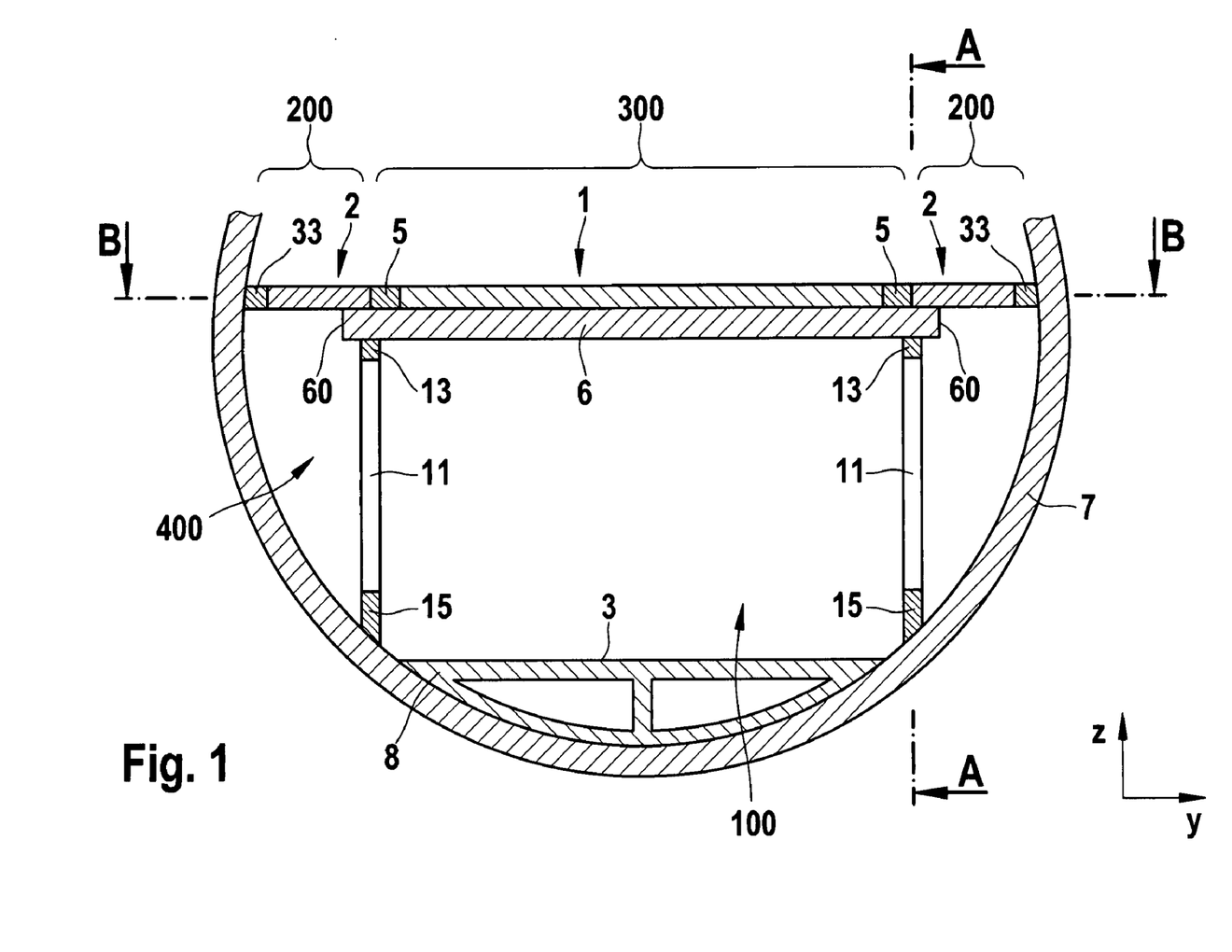
FIG. 1 shows a front view of an embodiment.
Figure 2:
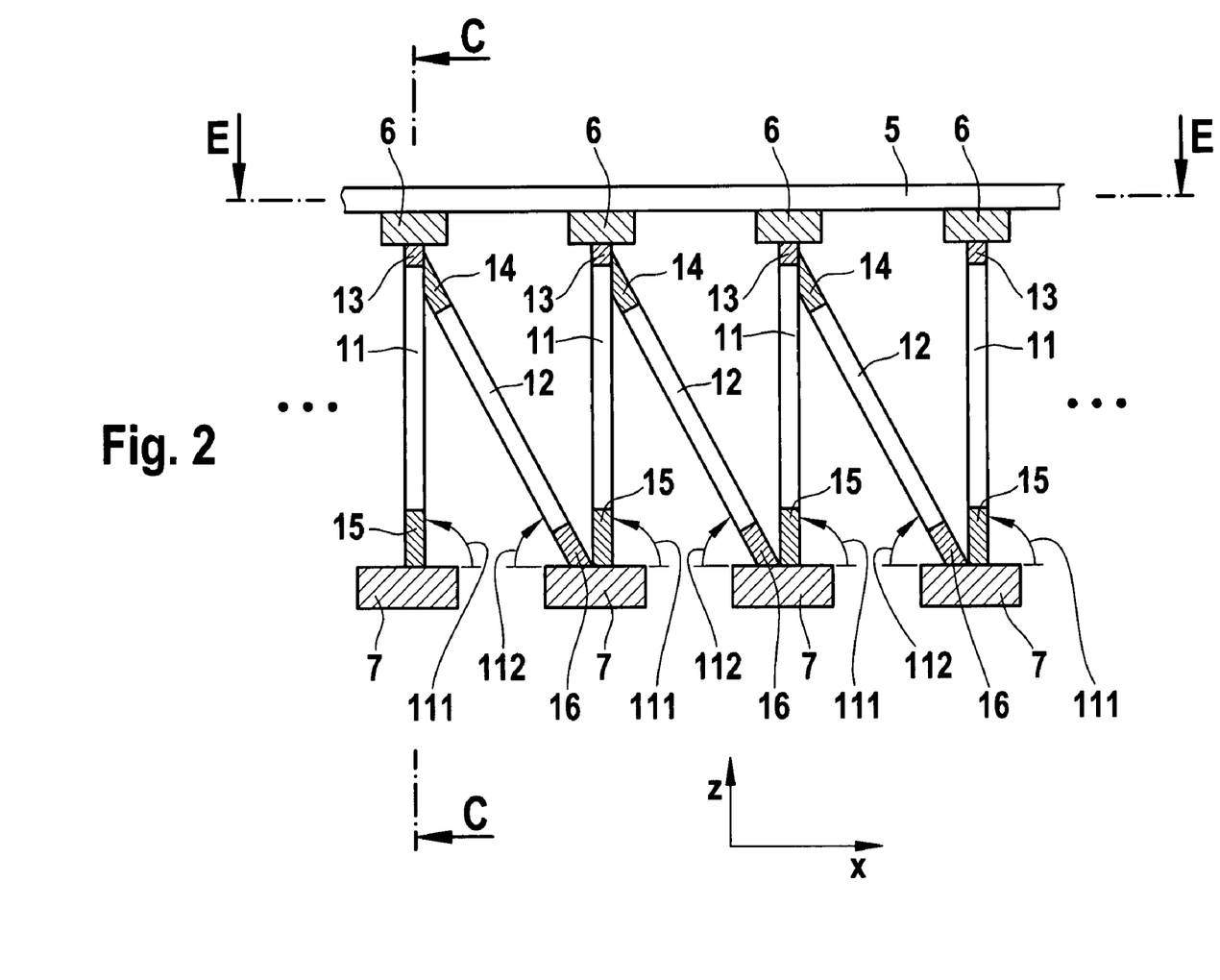
FIG. 2 shows a side view of the embodiment of FIG. 1.
Figure 3:
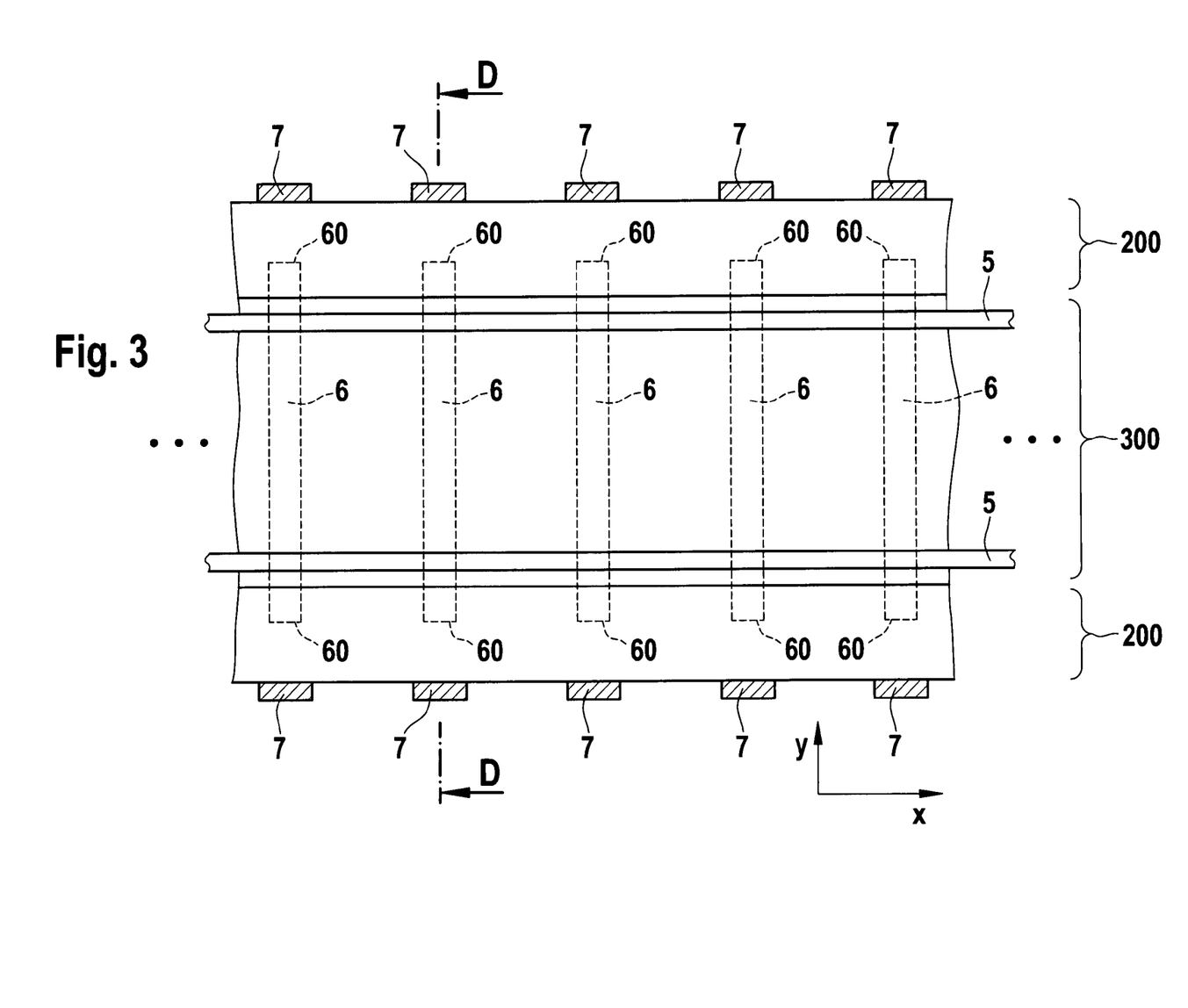
FIG. 3 shows a plan view of the embodiment of FIGS. 1 and 2.

An embodiment is described hereinafter with reference to FIGS. 1, 2 and 3, which show a front view, a side view and/or a plan view of the embodiment. In FIG. 1, the plane A is indicated in which the side view of FIG. 2 is located. Furthermore, the plane B is indicated in which the plan view of FIG. 3 is located. In FIG. 2, the indicated plane C denotes the front view of FIG. 1 and the indicated plane E denotes the plan view of FIG. 3. In FIG. 3, the front view of FIG. 1 is located within the indicated plane D.

The shape of an aircraft fuselage is fixed by a plurality of frames 7 arranged parallel to one another. Said frames are, in particular with wide-bodied aircraft, circular, elliptical or oval. With small aircraft they may also sometimes have a polygonal shape.

In a passenger aircraft, the space inside the fuselage is divided for different purposes. The passengers are accommodated in a first region, generally in the upper region. A freight goods space 100, for example for baggage, is located in the lower region. To the side of the freight goods space 100 and defined by the frames and upwards through the floor of the passenger space, an edge region 400 is located which is also known as the 'Bermuda triangle'. Supply lines, signal lines, etc. are conventionally laid in this edge region 400.

The floor for the passenger region is formed by central plates 1 in a central portion 300 and by outer plates 2 in an outer portion 200. The floor is supported by a structure which is made up of a plurality of cross beams 6 and a plurality of struts 11, 12. The plurality of cross beams 6 are typically arranged in parallel to one another (FIG. 3). The alignment of the cross beams 6 of elongate configuration, with their longitudinal axis, is substantially parallel to the transverse direction of the fuselage y. In some arrangements, the cross beams 6 together with spars 5 form a grid-shaped supporting structure. This structure may be preassembled outside the aircraft fuselage and may then be positioned as a preassembled unit onto the struts 11, 12.

The cross beams 6 are, in the transverse direction y, spaced apart from the frames 7. As a result, a free space is produced between the ends 60 of the cross beams 6 in the longitudinal direction and the frames 7. Access to the edge region 400 may thus be provided from above, if the outer floor plates 2 are removed.

Hereinafter, more detail is provided in particular of the arrangement of the struts, which transmit both the forces in the vertical direction z and also the forces in the longitudinal direction x to a primary fuselage structure, the primary fuselage structure comprising the frames 7, a fuselage skin and so-called stringers, i.e. longitudinal supporting structures arranged on the fuselage skin.

The cross beams 6 are supported by the struts 11, 12. The forces of gravity, i.e. forces acting in the vertical direction, are transmitted by the struts 11, 12 to the primary fuselage structure. The force distribution onto the individual struts is determined according to known relationships, such as for example a force parallelogram. The struts 11, 12 may be dimensioned according to the forces compressing said struts, amongst others.

The forces acting in the longitudinal direction x are obtained by the use of differently aligned struts. In the view of FIG. 2, two differently aligned struts 11, 12 are used. The first struts, denoted below as perpendicular struts 11, are aligned along a direction vector 111 or direction 111 which is parallel to the vertical direction. This perpendicular direction vector 111 has no component in the longitudinal direction x. The other struts, known below as oblique struts 12, are aligned along a direction vector 112 or in a direction 112, which has a component in the longitudinal direction x. Thus the direction vectors 111, 112 of the perpendicular struts 11 and the oblique struts 12 differ in their component in the longitudinal direction x.

The distance of the fastening points of the perpendicular strut 11 from the oblique strut 12 on the cross beam 6 and the distance of the fastening points of the perpendicular strut 11 from the oblique strut 12 on the frames is fixed. Similarly, the lengths of the two struts 11, 12 are predetermined. As a result, a parallelogram is substantially defined. The geometry and internal angle thereof is established by the two struts 11, 12 not being parallel to one another. Thus the structure in the longitudinal direction x is rigid and is able to transmit the forces acting in this direction.

The perpendicular strut 11 has an upper strut end 13 and a lower strut end 15 which are provided with suitable fastening devices. Similarly, the oblique strut 12 also has an upper strut end 14 and a lower strut end 16 with suitable fastening devices. The respective upper strut end 13, 14 is connected to a cross beam 6. Preferably, the connecting points of the upper strut ends 13, 14 are located in the vicinity of one another. The lower strut ends 15, 16 of the perpendicular strut 11 and the oblique strut 12 are connected to the primary fuselage structure, as shown in FIGS. 1 and 2. A perpendicular strut 11 and an oblique strut 12 which are associated with a cross beam 6 and are connected thereto, are associated with two different frames 7 and accordingly connected thereto. As a result, the different component is obtained in the longitudinal direction x of the direction vector 11 of the perpendicular strut 11 and of the direction vector 112 of the oblique strut 12.

An additional stability of the supporting structure through the cross beams 6 and the struts 11, 12 may be achieved by spars 5, which connect the cross beams to a grid-like structure (see FIG. 3).

A floor 3 for the freight region 100 may be provided by a reinforcement 8, which allows an additional flux of force in the transverse direction between the left and right frame side.

Figure 4:
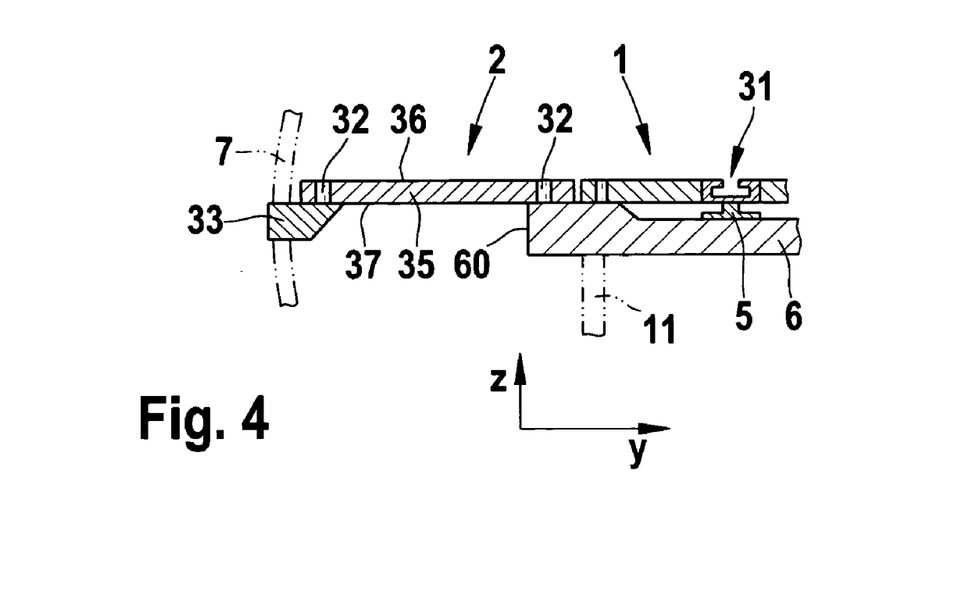
FIG. 4 shows an enlarged detail of a further embodiment according to FIG. 1.

In FIG. 4, a detailed view is shown for a further embodiment of the outer portion 200 and the outer floor plate 2. The elements described in connection with the first embodiment may be adopted in this embodiment. The outer plate 2 may substantially consist of a plate 35, which is produced from a composite material. In one alternative, an intermediate layer with a honeycomb structure is inserted in the composite material. In order to fasten the outer plate to the cross beam 6 and/or the frame 7, continuous sleeves 32 are inserted in the outer plate 2. By means of these sleeves 32, suitable fastening materials, for example rivets, screws, bolts etc. may be passed through. The sleeves 32 protect the body 35 made of the composite material from damage, when the fastening means are inserted or removed. Corresponding acting forces or stresses are absorbed by the sleeves 32. As a result, it is possible to fasten and to remove repeatedly the outer floor plates 2. Such a removal is, for example, expedient if further systems are intended to be integrated in the edge region 400 subsequently during assembly.

The sleeves 32 are optionally produced in one piece and made of a non-corrosive material, for example glass.

The outer plate 2 may be fastened to the frame 7 by an angle bracket 33 or any other type of fastening device.

One advantageous embodiment consists in fastening the outer plate 2 only on one side with a rivet or similar fastening means, i.e. either to the cross beam 6 or to the frame 7. On the other side, it is fastened by means of a joint. As a result, the outer floor plate 2 may then advantageously be folded away.

The spars 5 may, at the same time, comprise an integrated seat rail 31. To this end, the spar 5 comprises a groove tapering towards the top.

Figure 5:
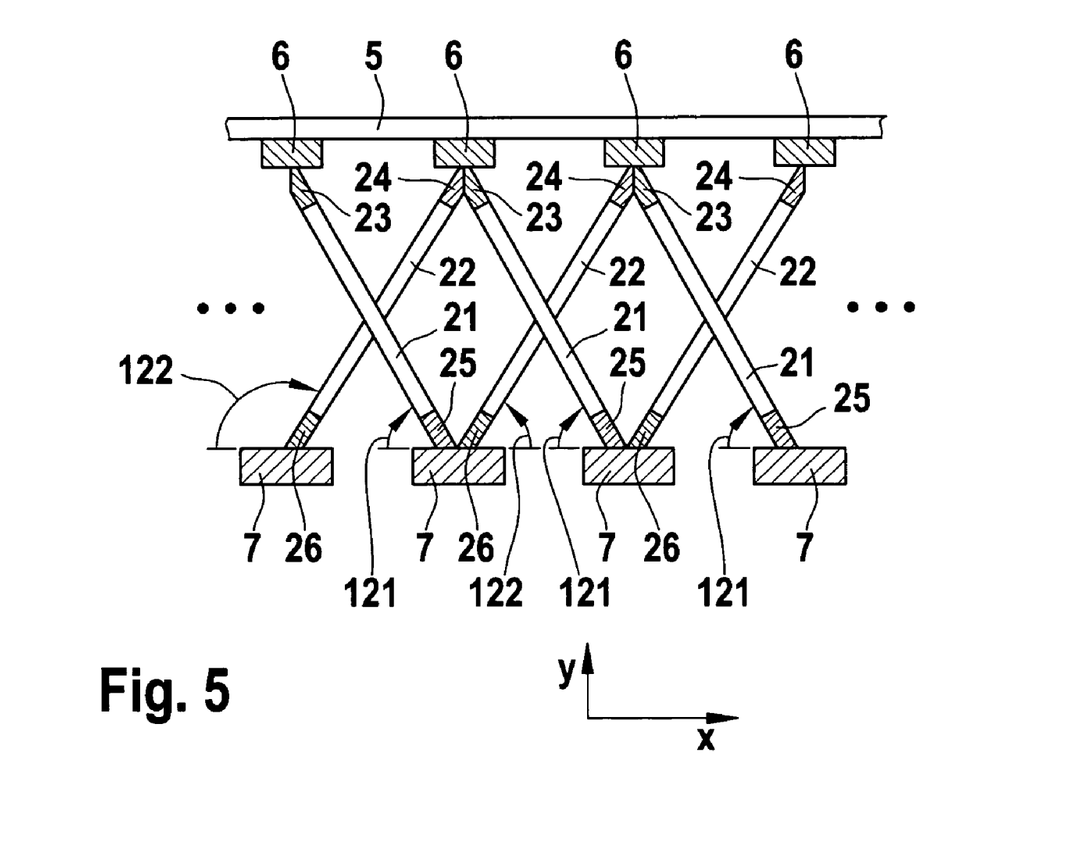
FIG. 5 shows a side view of a second embodiment.

In FIG. 5, a side view of a second embodiment of the present invention is shown the front view and the plan view of which correspond to FIGS. 1 and 2, respectively. Instead of a perpendicular strut and an oblique strut, two oblique struts 21, 22 are used in this embodiment. One strut 21 of the struts 21, 22 has a forwardly inclined direction 121 or a corresponding direction vector 121, and the other strut 22 has a rearwardly inclined direction 122 or corresponding direction vector 122. The term "forwardly inclined" is understood to denote, when viewing the strut from bottom to top, that the strut points towards the aircraft tip (negative longitudinal direction x). The term "rearwardly inclined" accordingly denotes that the strut 22, when viewed from bottom to top, points towards the aircraft tail (i.e. in the positive longitudinal direction x). By this arrangement of the forwardly inclined and rearwardly inclined struts 21, 22, a flux of force is also obtained of a force acting in the longitudinal direction on the frames 7. The amount of inclination of the individual struts 21, 22 maybe equal, as shown, but also different.

Figure 6:
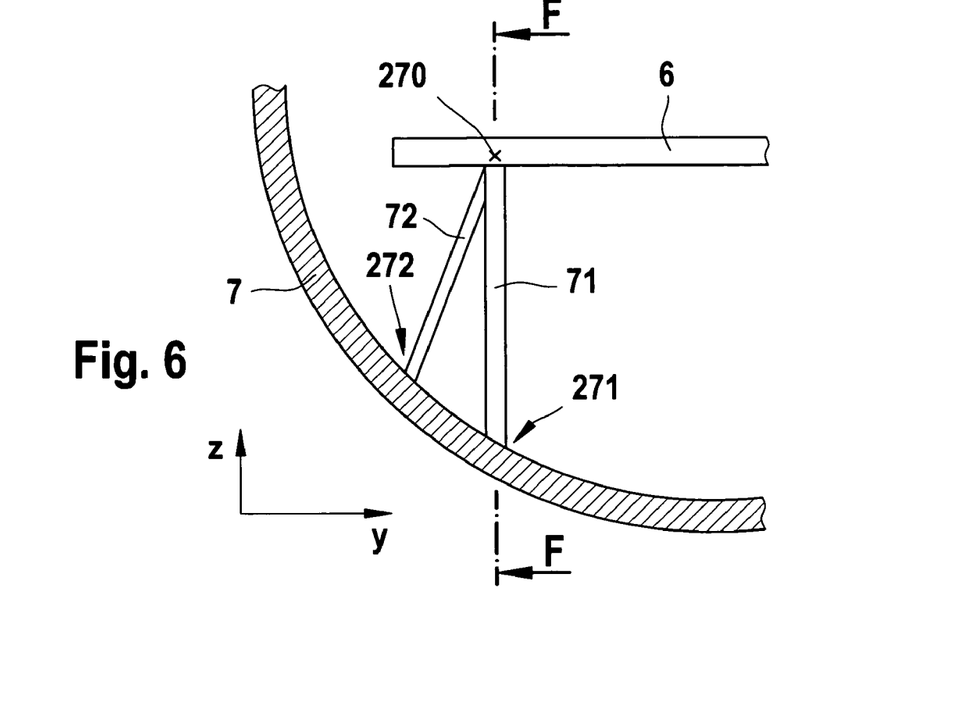
FIG. 6 shows a front view of a third embodiment.
Figure 7:
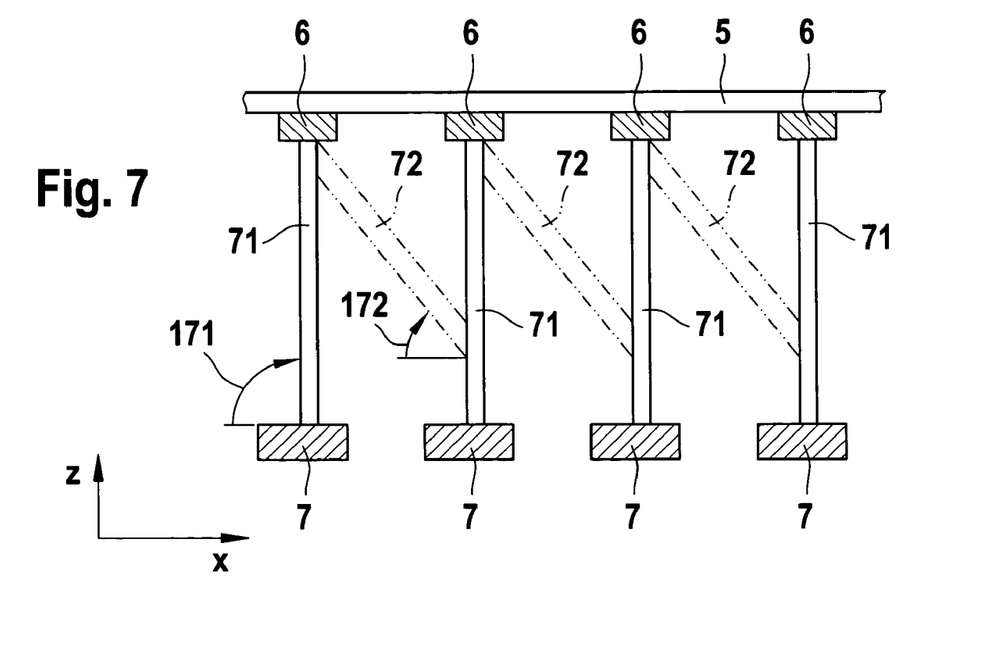
FIG. 7 shows a side view of the third embodiment of FIG. 6.

A third embodiment is described together with FIGS. 6 and 7. The side view shown in FIG. 7 is produced for the plane F indicated in FIG. 6. In the aforementioned embodiments, the struts are arranged in rows and, within these rows, are arranged in one plane. In this third embodiment, the struts are further arranged in a row in the direction of the longitudinal direction x. However, the individual struts 71, 72 are no longer located within one plane. The fastening point 272 of the strut 72 is located higher than the fastening point 271 of a second strut 71. On the cross beam 6, the two struts 71 may be further connected to a fastening point or two fastening points 270 located in the vicinity of one another. However, it is essential for the construction that in the projection as is shown in the side view of FIG. 7 the direction 171 of one strut 71 of the struts 71, 72 differs from the direction 172 of the other strut 72. In other words, the components of the corresponding direction vectors 71, 72 differ in the longitudinal direction x.

Figure 8:
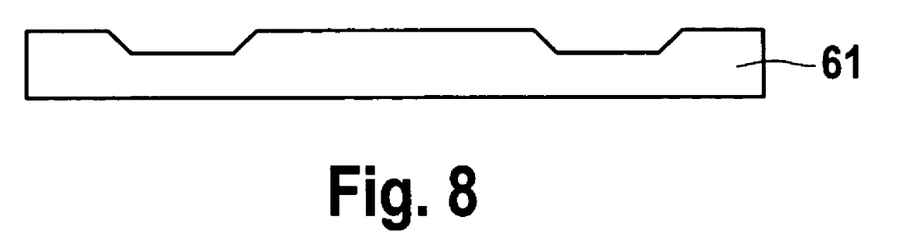
FIG. 8 shows a detailed view of a further embodiment.
Figure 9:
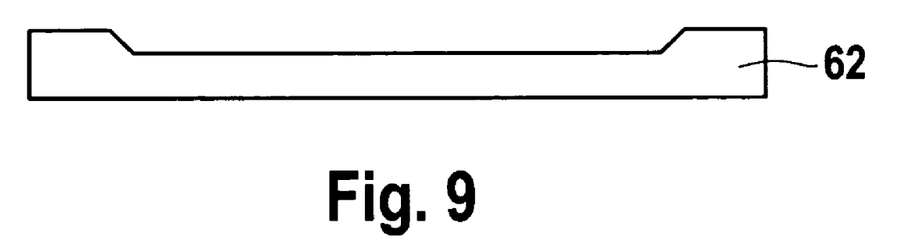
FIG. 9 shows a detailed view of a further embodiment.
Figure 10:
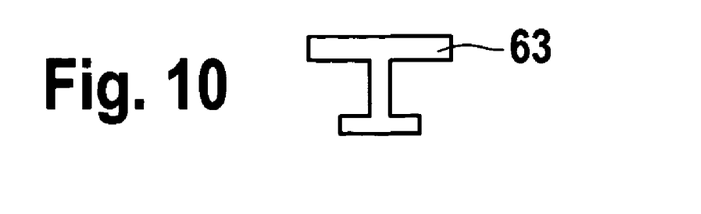
FIG. 10 shows a side view of one of the embodiments of FIGS. 8 and 9.

In FIGS. 8, 9 and 10, cross beams 61, 62, 63 are shown in front view and side view, which may be used in the disclosed embodiments. The height of the cross beam 61, shown in FIG. 8, is lower in individual portions of the cross beam 61. As a result, a saving in weight may be achieved or the spars 5 may be inserted into the region of reduced height. In FIG. 9, a further cross beam 62 is shown of which the height is reduced in the entire central region. Advantageously, the cross beams may be double T-shaped in cross section, as is shown for example for the cross beam 63 in FIG. 10.

Figure 11:
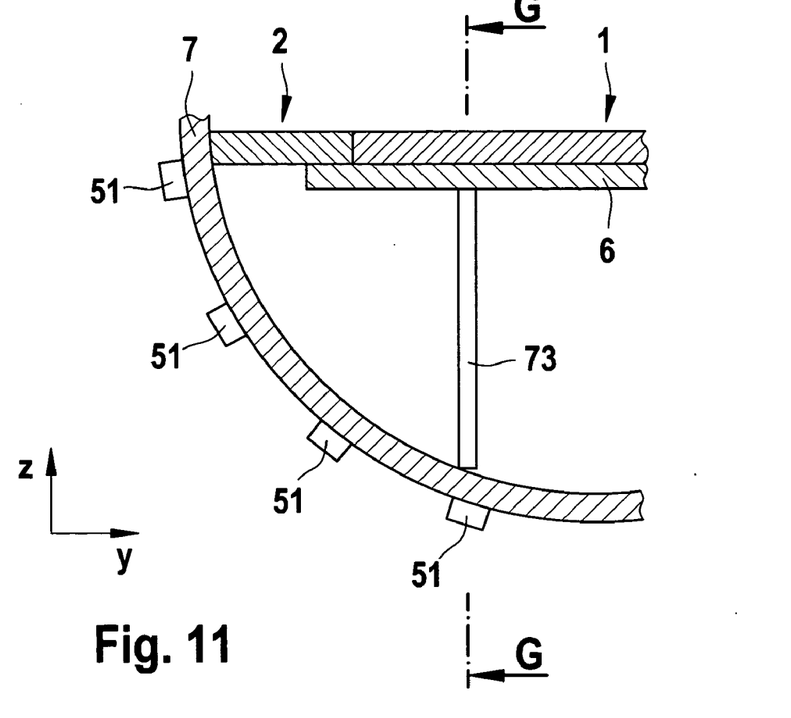
FIG. 11 shows a front view of a fourth embodiment.
Figure 12:
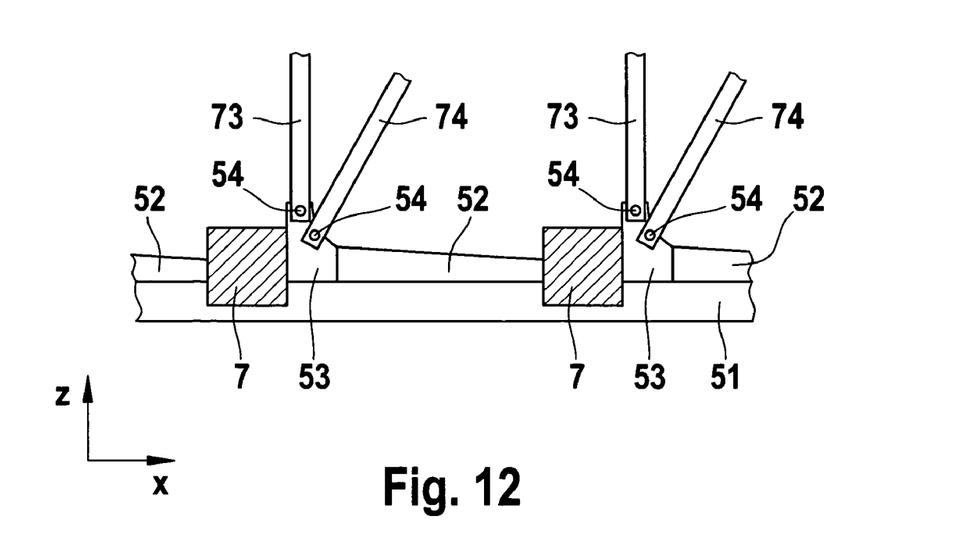
FIG. 12 shows a detailed view from the side of the fourth embodiment of FIG. 11.

In FIGS. 11 and 12, a fourth embodiment of the present invention is shown which serves to describe an example for fastening the struts to the frames 7. The individual frames 7 of an aircraft fuselage are arranged parallel to one another and connected via spars 51 extending in the longitudinal direction x. A fastening device 53 may be arranged on such a spar. Said fastening device has suitable fastening tabs, bores 54 or projections to which the strut ends of the struts 73, 74 may be fastened. The strut ends may, for example, be provided in the form of joints, preferably hinged joints. For mechanical stability and improved force transmission, it may be advantageous to reinforce the spar 51 on which the mounting device 53 is arranged, by means of a reinforcing device 52, in order to ensure an improved force transmission.

The cross beam used in the aforementioned embodiments, advantageously already has a low weight due to its minimal length. An additional weight reduction may be achieved by the use of composite material for the cross beam. Alternatively, the cross beam may also be produced from metal. The struts may also be produced from aluminum or from a composite material. The spar 5 which also contains the seat rail is produced from a metal due to the stresses exerted thereon by the seats. Titanium is suitable here in particular due to its low corrosion. The floor plates, both in the central and outer portion, are produced from a composite material and preferably have a multilayered structure in which a honeycomb structure is incorporated. The frames 7 and the reinforcements 8 may preferably be produced in one piece from a composite material or alternatively from a metal.

Although the present invention has been described with reference to preferred embodiments, it is not restricted thereto.

In particular, the person skilled in the art will derive from the disclosed embodiments proposals for different geometric arrangements of the struts. In doing so, combinations of the geometries described in the different embodiments are possible. In particular, it is also possible to fasten the struts to fastening points on the cross beam which are spaced apart in the transverse direction y.

What is claimed is:

1. A floor structure for a fuselage, comprising:
    a plurality of cross beams to which respectively at least one first strut and at least one second strut are associated for connecting the respective cross beam to the fuselage;
    the at least one first strut being aligned parallel to a first direction vector and the at least one second strut parallel to a second direction vector;
        wherein the projections of the first direction vector and of the second direction vector onto the longitudinal direction of the fuselage are different for absorbing a force acting in the longitudinal direction of the fuselage on the floor structure, through the first and second struts;
    an outer floor plate fastened to at least one cross beam and to the fuselage, wherein an edge of the outer floor plate is releasably fastened to at least one of the cross beam and the fuselage;
    wherein the outer floor plate is produced from at least one of a composite material and a plurality of layers; and
    wherein the outer floor plate comprises one-piece sleeves that are continuous from an upper face of the floor edge to a lower face of the outer floor plate, the one-piece sleeves serving to fasten the outer floor plate to at least one of the cross beam and the fuselage by fastening means inserted into the one-piece sleeves.

2. The floor structure according to claim 1, wherein the plurality of cross beams are arranged in the transverse direction of the fuselage at a distance from the fuselage.

3. The floor structure according to claim 1, wherein the plurality of cross beams are arranged parallel to one another.

4. The floor structure according to claim 3, wherein the struts of one row are arranged in one plane.

5. The floor structure according to claim 1, wherein the first and second struts are arranged in at least one row which is aligned in the longitudinal direction of the fuselage.

6. The floor structure according to claim 5, wherein the same number of first struts and the same number of second struts are arranged in one of the rows.

7. The floor structure according to claim 1, wherein the first struts are aligned parallel to the vertical direction of the fuselage.

8. The floor structure according to claim 7, wherein the cross beams are arranged parallel to the frames.

9. The floor structure according to claim 1, wherein the fuselage has a plurality of frames and on each cross beam at least one first strut and one second strut are arranged and this first arranged strut and this second arranged strut are fastened to two different frames.

10. The floor structure according to claim 1, wherein the one-piece sleeves are formed from a glass material.

11. The floor structure according to claim 1, wherein the struts are connected by means of a hinged joint to at least one of the cross beam and the fuselage.

* * * * *